(12) United States Patent
Brown et al.

(10) Patent No.: US 8,657,239 B2
(45) Date of Patent: Feb. 25, 2014

(54) KRUEGER

(75) Inventors: James Brown, Bristol (GB); Edmund Kay, Bath (GB)

(73) Assignee: Airbus Operations Limited, Bristol (GB)

( * ) Notice: Subject to any disclaimer, the term of this patent is extended or adjusted under 35 U.S.C. 154(b) by 141 days.

(21) Appl. No.: 13/279,642

(22) Filed: Oct. 24, 2011

(65) Prior Publication Data

US 2012/0104180 A1 May 3, 2012

(51) Int. Cl.
*B64C 3/50* (2006.01)

(52) U.S. Cl.
USPC .......................... 244/214; 244/213; 244/215

(58) Field of Classification Search
USPC ................... 244/214, 213, 215, 1 N
See application file for complete search history.

(56) References Cited

U.S. PATENT DOCUMENTS

| 3,578,264 | A | * | 5/1971 | Kuethe | 244/200.1 |
| 4,354,648 | A | * | 10/1982 | Schenk et al. | 244/200.1 |
| 5,058,837 | A | * | 10/1991 | Wheeler | 244/200.1 |
| 5,158,252 | A | | 10/1992 | Sakurai | |
| 5,598,990 | A | * | 2/1997 | Farokhi et al. | 244/200.1 |
| 5,845,873 | A | * | 12/1998 | Millard | 244/1 R |
| 7,766,281 | B2 | * | 8/2010 | Lorkowski et al. | 244/215 |
| 8,226,048 | B2 | * | 7/2012 | Beyer et al. | 244/214 |
| 2001/0038058 | A1 | * | 11/2001 | Gleine et al. | 244/198 |
| 2002/0005461 | A1 | * | 1/2002 | Nettle et al. | 244/214 |
| 2002/0109048 | A1 | * | 8/2002 | Bliesner | 244/214 |
| 2006/0000952 | A1 | * | 1/2006 | Rampton et al. | 244/214 |
| 2006/0169847 | A1 | * | 8/2006 | Konings | 244/214 |
| 2006/0202089 | A1 | * | 9/2006 | Reckzeh et al. | 244/215 |
| 2009/0072093 | A1 | * | 3/2009 | Fox et al. | 244/214 |
| 2010/0019096 | A1 | * | 1/2010 | Pecora et al. | 244/213 |
| 2010/0219299 | A1 | * | 9/2010 | Holzhausen | 244/214 |
| 2010/0258679 | A1 | * | 10/2010 | Knacke et al. | 244/214 |
| 2010/0288888 | A1 | * | 11/2010 | Coconnier | 244/214 |
| 2010/0327121 | A1 | * | 12/2010 | McAlinden et al. | 244/215 |
| 2011/0095135 | A1 | * | 4/2011 | Miller et al. | 244/200.1 |
| 2011/0114795 | A1 | * | 5/2011 | Voss et al. | 244/213 |
| 2011/0174933 | A1 | * | 7/2011 | Blades | 244/213 |
| 2012/0061522 | A1 | * | 3/2012 | Sullivan et al. | 244/198 |
| 2012/0061523 | A1 | * | 3/2012 | Havar et al. | 244/214 |
| 2012/0292454 | A1 | * | 11/2012 | Schroeder | 244/214 |

FOREIGN PATENT DOCUMENTS

| EP | 1338506 A1 | 8/2003 |
| EP | 1607324 A1 | 12/2005 |
| GB | 2260521 A | 4/1993 |

OTHER PUBLICATIONS

British Search Report for 1018176.6 dated Feb. 3, 2011.

* cited by examiner

*Primary Examiner* — Christopher P Ellis
*Assistant Examiner* — Medhat Badawi
(74) *Attorney, Agent, or Firm* — Lowe Hauptman & Ham, LLP

(57) ABSTRACT

A Krueger, or leading edge flap, deployable from a lower aerodynamic surface of an aircraft main wing element so as to form a slot between the Krueger and the main wing element when deployed, the deployed Krueger having a leading edge, a trailing edge and upper and lower aerodynamic surfaces extending between the leading edge and the trailing edge, and a flow deflector which provides an effectively divergent flap profile thickness in the downstream direction at or adjacent the Krueger trailing edge so as to direct airflow away from the lower aerodynamic surface of the deployed Krueger towards an upper aerodynamic surface of the main wing element. Also, aircraft wing assembly including a main wing element and the Krueger.

17 Claims, 4 Drawing Sheets

Figure 3a
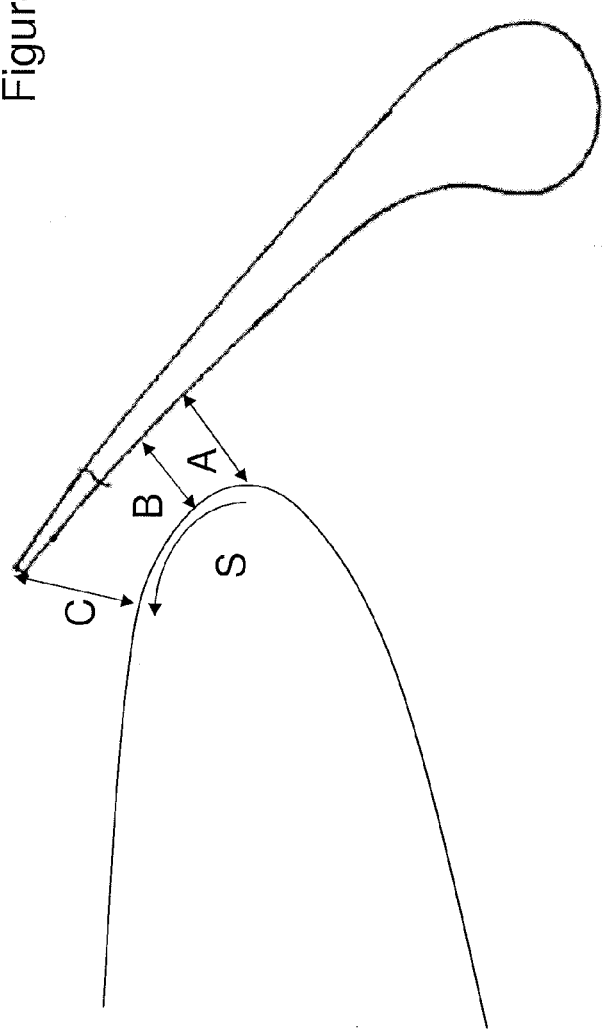
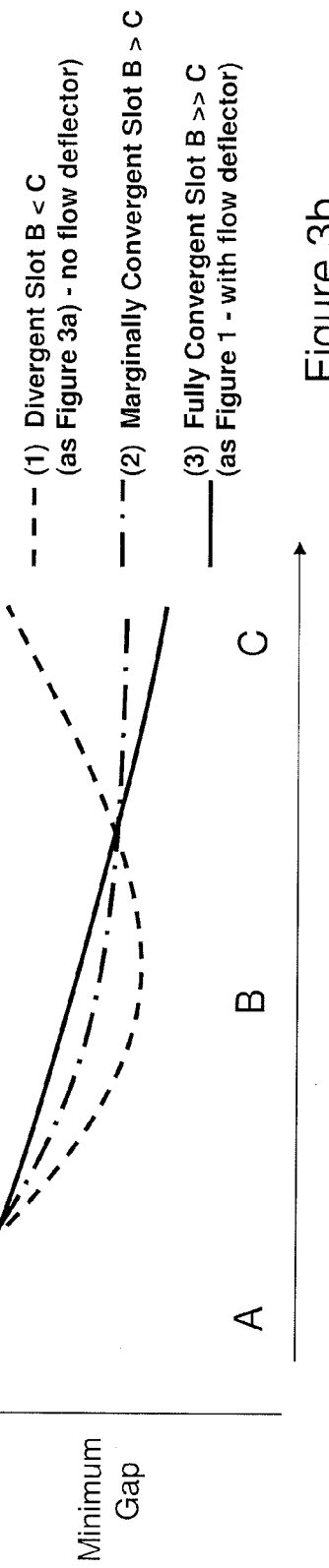
Figure 3b

KRUEGER

RELATED APPLICATIONS

The present application is based on, and claims priority from, British Application Number 1018176.6, filed Oct. 28, 2010, the disclosure of which is hereby incorporated by reference herein in its entirety.

FIELD OF THE INVENTION

The present invention relates to a Krueger, or leading edge flap, for an aircraft wing.

BACKGROUND OF THE INVENTION

A Krueger, or leading edge flap, is a high-lift device deployable from the lower aerodynamic surface of an aerofoil, such as an aircraft wing. When stowed the Krueger trailing edge is disposed at or near the wing leading edge, and a portion of the Krueger device makes up part of the wing lower surface. When deployed the Krueger rotates forwardly from a hinge near the wing leading edge, and the Krueger trailing edge remains adjacent the wing leading edge.

Whilst the Krueger is functionally similar to a slat when deployed, slats are deployed forwardly from the wing leading edge.

Leading edge high-lift devices can be either "slotted" or "un-slotted". Slotted means that a gap, or slot, is opened up between the deployed high-lift device and the wing leading edge. Un-slotted means that the deployed high-lift device is sealed to the wing leading edge. Airflow through the slotted gap can improve the maximum lift coefficient of the wing in a high-lift configuration, i.e. with the high-lift device deployed.

For best performance the gap between the deployed high-lift device and the wing should be convergent. That is to say, the gap between the wing leading edge and the lower aerodynamic surface of the high-lift device should progressively reduce up to the trailing edge of the deployed high-lift device. If the slot is convergent-divergent the circulation around the high-lift device is reduced due to the less than optimal aerodynamic setting.

A convergent slot can normally be achieved by positioning the deployed device at an appropriate angle and location ahead of the wing leading edge. However, kinematic constraints, particularly for Krueger actuation mechanisms, can limit the positioning of the deployed device and create a convergent-divergent slot. In particular, the available extent of rotation of the Krueger during deployment will affect the angle of the deployed Krueger. Further rotation to an aerodynamically more desirable angle may not be possible without resulting in a more complex, heavier design.

SUMMARY OF THE INVENTION

A first aspect of the invention provides a Krueger, or leading edge flap, deployable from a lower aerodynamic surface of an aircraft main wing element so as to form a slot between the Krueger and the main wing element when deployed, the deployed Krueger having a leading edge, a trailing edge and upper and lower aerodynamic surfaces extending between the leading edge and the trailing edge, and a flow deflector which provides an effectively divergent flap profile thickness in the downstream direction at or adjacent the Krueger trailing edge so as to direct airflow away from the lower aerodynamic surface of the deployed Krueger towards an upper aerodynamic surface of the main wing element.

A further aspect of the invention provides an aircraft wing assembly including a main wing element and a Krueger in accordance with the first aspect.

The invention is advantageous in that the flow deflector acts to reduce, or eliminate, slot divergence, particularly where this cannot otherwise be achieved due to kinematic constraints. The profile of the upper aerodynamic surface of the Krueger is dictated by the profile of the lower surface of the main wing element, since these must match when the Krueger is retracted. By directing the airflow away from adjacent the trailing edge of the lower aerodynamic surface of the Krueger towards the wing upper surface the flow deflector can reduce, or eliminate the slot divergence.

The flow deflector may be fixed with respect to the Krueger trailing edge. Preferably, the entire Krueger including the flow deflector is stowed within a profile of the main wing element when the Krueger is retracted. Therefore, the fixed flow deflector does not contribute to cruise drag.

The lower surface panel of the main wing element from which the Krueger is constructed can be flexible or rigid depending on the design concept of the Krueger. In particular, the Krueger trailing edge may be flexible.

The flow deflector may be formed as a profiled surface of the Krueger lower aerodynamic surface. The upper and lower Krueger aerodynamic surfaces may be divergent in the downstream direction at or adjacent the Krueger trailing edge.

Alternatively, the flow deflector may be formed as a profiled component, e.g. a wedge, attached to the Krueger lower aerodynamic surface at or adjacent the Krueger trailing edge. The flow deflector may be detachable from the Krueger lower surface.

In either case, the flow deflector effectively forms a divergent Krueger profile in the Krueger trailing edge region such that airflow over the lower aerodynamic surface is deflected downwardly towards the upper surface of the main wing element. It is not necessary that the divergent Krueger profile has its thickest part exactly at the Krueger trailing edge. For example, the flow deflector may provide a profile thickness for the Krueger adjacent the Krueger trailing edge that is greater than the Krueger profile thickness forward of the flow deflector.

In a further alternative example, the flow deflector may be formed as a tab projecting downwardly from the Krueger lower aerodynamic surface at or adjacent the Krueger trailing edge. The tab creates a region or recirculating air just in front of the tab which has the effect of smoothly deflecting the bulk airflow over the lower aerodynamic surface of the Krueger downwardly towards the upper surface of the main wing element.

The flow deflector at or adjacent the Krueger trailing edge is not limited to a consistent thickness or angle across the span of the Krueger. The thickness may vary progressively across the span or may alternatively be applied in a stepped variation to form a castellated or sawtooth pattern. A stepped variation can act as vortex generators by introducing multiple vortical flows into the slot across the Krueger span. This can improve mixing between the wake from the Krueger trailing edge and the flow through the slot which can reduce the adverse interference between the wake and the wing boundary layer. There is therefore a resultant improvement in the maximum lift of the wing.

It is known that a thick Krueger trailing edge produces a wake which could disturb the wing boundary layer. The flow deflector has the effect of increasing the Krueger wake thickness. Accordingly, there is a trade off between the positive effect of increasing the circulation around the Krueger to suppress the suction wing peak as a result of improved slot convergence, and disturbance to the wing boundary layer by the interaction of the thickened Krueger wake due to the increased wake thickness caused by the flow deflector. The Krueger/flow deflector design therefore needs to be optimised for maximum aerodynamic performance.

Integrally forming the flow deflector with the Krueger may provide advantages in terms of reduced maintenance, reduced parts count, reduced production time, improved stiffness and weight saving. However, a detachable flow deflector may provide advantages for ease of removal for repair, testing etc.

The deployed Krueger, if suitably placed, may act as an insect shield for the main wing element. This would be particularly beneficial where the wing is a "laminar wing", i.e. where the intention is to maintain a laminar boundary layer over a large percentage of the wing at cruise. Insect debris on the wing leading edge can promote turbulent boundary layer flow. The invention is also applicable to conventional, non-laminar, wings.

The slot, which opens up between the Krueger and the main wing element when the Krueger is deployed, is preferably convergent forward of the flow deflector in the direction of the onset flow. The flow deflector reduces, or eliminates, divergence of the slot adjacent the Krueger trailing edge.

BRIEF DESCRIPTION OF THE DRAWINGS

Embodiments of the invention will now be described with reference to the accompanying drawings, in which:

FIG. 3a) illustrates graphically the convergence criteria of a gap between the main wing element and the deployed Krueger; and FIG. 3b) illustrates the graphical plot showing three cases where the gap is measured along a distance S from the leading edge of the main wing to the Krueger lower surface up to its trailing edge.

DETAILED DESCRIPTION OF EMBODIMENT(S)

Figure 1:
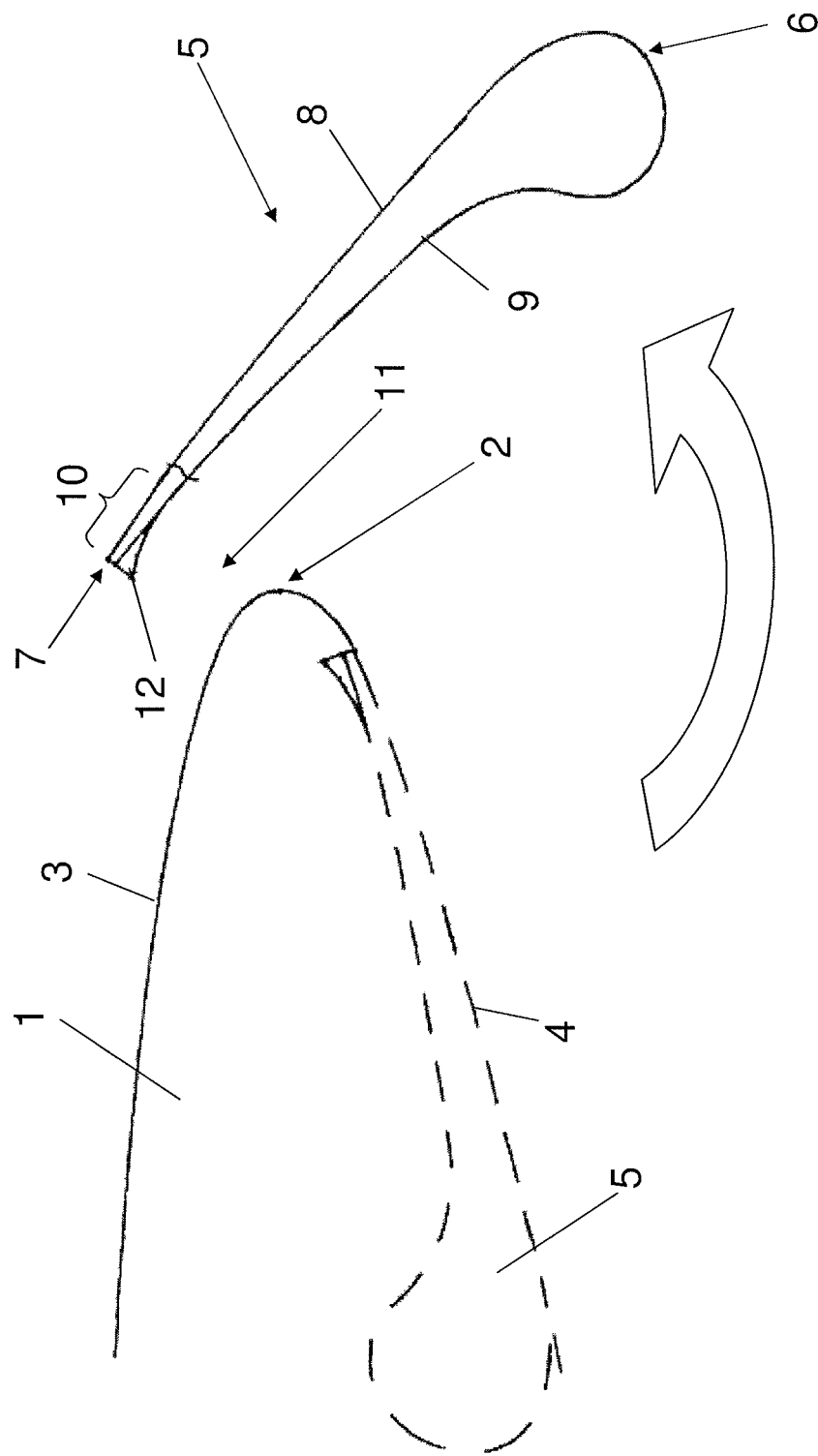
FIG. 1 illustrates schematically a section through an aircraft wing with a Krueger shown in its deployed position (full line) and retracted position (broken line)

FIG. 1 illustrates an aircraft wing comprising a main ("fixed") wing element 1 having a leading edge 2, an upper aerodynamic surface 3, and a lower aerodynamic surface 4. The upper and lower aerodynamic surfaces 3, 4 meet at the leading edge 2. A Krueger 5 is mounted to the main wing element 1 for movement between a retracted position (shown in broken line) and a deployed position (shown in full line). The leading edge Krueger 5 is a high-lift device deployed at low speed and high incidence to increase the camber and maximum lift coefficient of the wing. The Krueger is movable between its deployed and retracted positions by a Krueger actuation mechanism, which has been omitted from FIG. 1 for clarity.

The deployed Krueger 5 has a leading edge 6, a trailing edge 7, an upper aerodynamic surface 8 and a lower aerodynamic surface 9. The upper and lower aerodynamic surfaces 8, 9 meet at the leading and trailing edges 6, 7. A region of the Krueger adjacent the trailing edge 7 will hereafter be referred to as the trailing edge region 10.

The retracted Krueger 5 is stowed within the profile of the main wing element 1. The Krueger surface 8 forms part of the lower aerodynamic surface 4 of the main wing element 1 when the Krueger is retracted. Accordingly, the Krueger surface 8 is profiled to match the lower aerodynamic surface 4 of the main wing element 1.

The Krueger 5 rotates forwardly from the lower aerodynamic surface 4 of the main wing element 1 under action of the Krueger actuation mechanism (not shown) pivotally connected at one or more points to the Krueger 5.

The deployed Krueger 5 forms a slot 11 between the main wing element 1 and the Krueger lower aerodynamic surface 9. The Krueger 5 is therefore known as a "slotted Krueger". Airflow through the slot 11 acts to increase circulation around the Krueger which suppresses the leading edge suction pressure peak of the main wing, so improving aerodynamic performance of the wing at high incidence by delaying flow separation.

The Krueger 5 has a flow deflector 12 on the lower aerodynamic surface 9 in the trailing edge region 10. Without the flow deflector, the gap between the main wing element 1 and the lower aerodynamic surface 9 of the Krueger 5 would be decreasing and then increasing when progressing around from the wing leading edge 2 towards the Krueger trailing edge 7. This decreasing-increasing gap forms a convergent-divergent slot.

Ideally, the slot is only convergent such that it maximises the circulation around the Krueger to suppress the leading edge suction peak on the main wing element and provide a high maximum lift coefficient on the wing. However, if the slot is convergent-divergent, then the airflow through the slot provides a reduced circulation around the Krueger with the subsequent degradation of the maximum lift coefficient of the wing as a result of an increase of the wing leading edge pressure suction peak.

The slot 11 geometry is defined, in part, by the angle and location of the deployed Krueger 5 ahead of the wing leading edge 2. Kinematic constraints on the Krueger actuation mechanism (not shown) mean that the slot geometry cannot be optimised as this would result in a more complex, heavier Krueger actuation mechanism design. Instead, the flow deflector 12 acts to reduce, or eliminate the slot divergence.

The flow diverter 12 is stowed with the Krueger 5 within the profile of the main wing element 1 when the Krueger is retracted. Therefore, the flow deflector 12 does not contribute to cruise drag.

The flow deflector 12 comprises a small, curved wedge attached to the lower aerodynamic Krueger surface 9 positioned at the trailing edge region 10. The flow deflector 12 directs the airflow away from the lower Krueger surface 9 towards the wing upper surface 3 which has the effect of converging the flow in the slot 11 between the wing leading edge 2 and the Krueger trailing edge 7. This can have an aerodynamic benefit of providing an improved circulation of the flow around the Krueger which reduces the wing suction peak pressures and subsequently improves the wing boundary layer.

The wedge-shaped flow deflector 12 necessarily increases the thickness of the Krueger trailing edge 7. This thick trailing edge creates a thicker wake from the Krueger 5, which undesirably could interfere with the wing boundary layer.

The design of the of the flow deflector 12 can be optimised to maximise the desirable effects of increased Krueger circulation and minimise the undesirable effects of the thicker Krueger wake.

Figure 2:
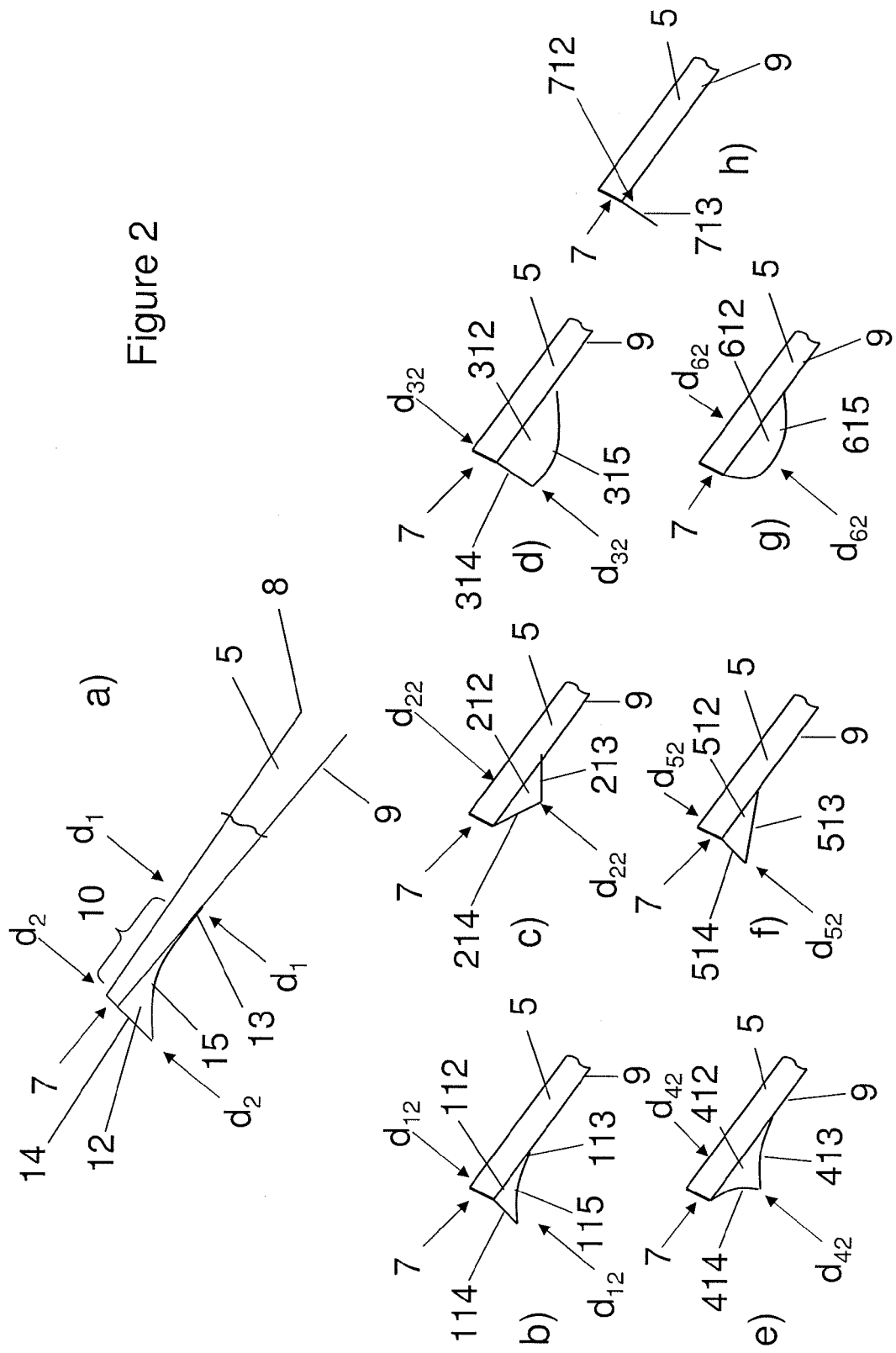
FIG. 2a) illustrates the Krueger trailing edge region in detail showing the flow deflector.
FIGS. 2b) to 2g) illustrate alternative flow deflector arrangements for the Krueger.

The wedge-shaped flow deflector 12 is shown in detail in FIG. 2a) and features a tapered front edge 13 blended into the lower aerodynamic Krueger surface 9, and a blunt planar back face 14 coincident with the Krueger trailing edge 7. The flow deflector 12 has a concave lower surface 15. The minimum profile thickness $d_1$ for the Krueger 5 occurs just forward (upstream) of the Krueger trailing edge region 10. The maximum profile thickness $d_2$ in the Krueger trailing edge region 10 dictates the Krueger wake thickness. In this embodiment, $d_2$ is coincident with the Krueger trailing edge 7.

Whilst in the embodiment described above the flow deflector 12 is a separate part attached to the lower aerodynamic Krueger surface 9, the flow deflector could be integrally formed with the Krueger 5. In this case, the lower aerodynamic Krueger surface 9 would be profiled to form the flow deflector 12.

FIGS. 2b) to 2h) illustrate several alternative arrangements for the flow deflector. In FIG. 2b) the flow deflector 112 has a wedge-shaped profile and features a tapered front edge 113 blended into the lower aerodynamic Krueger surface 9, and a blunt planar back face 114 extending rearwardly from the Krueger trailing edge 7. The flow deflector 112 has a concave lower surface 115. The maximum profile thickness $d_{12}$ is aft of the Krueger trailing edge 7.

In FIG. 2c) the flow deflector 212 has a triangular profile and features a planar inclined front face 213 and a planar inclined back face 214 extending to the Krueger trailing edge 7. The maximum profile thickness $d_{22}$ is forward of the Krueger trailing edge 7.

In FIG. 2d) the flow deflector 312 features a convex lower surface 315 and a blunt planar back face 314 substantially coincident with the Krueger trailing edge 7. The maximum profile thickness $d_{32}$ is coincident with the Krueger trailing edge 7.

In FIG. 2e) the flow deflector 412 features a concave front surface 413, which is blended into the lower aerodynamic Krueger surface 9, and a concave back surface 414, which extends to the Krueger trailing edge 7. The maximum profile thickness $d_{42}$ is forward of the Krueger trailing edge 7.

In FIG. 2f) the flow deflector 512 has a triangular profile and features a planar inclined lower surface 515 and a planar inclined back face 514 extending rearwardly from the Krueger trailing edge 7. The maximum profile thickness $d_{52}$ is aft of the Krueger trailing edge 7.

In FIG. 2g) the flow deflector 612 has a convex lower surface 615 extending from the lower aerodynamic Krueger surface 9 to the Krueger trailing edge 7. The maximum profile thickness $d_{62}$ is forward of the Krueger trailing edge 7.

In each of the embodiments described above with reference to FIGS. 2b) to g) the flow deflectors 112, 212, 312, 412, 512, and 612 may be formed as separate parts attached to the lower aerodynamic Krueger surface, or may be integrally formed with the Krueger 5.

In FIG. 2h) the flow deflector 712 is formed as a tab 713 extending downwardly from the lower aerodynamic Krueger surface 9 adjacent the Krueger trailing edge 7. The tab 713 creates a region or recirculating air just in front of the tab such that the bulk airflow over the lower aerodynamic Krueger surface 9 is deflected downwardly This type of deflector could be fixed or hinged about its base.

FIG. 3a) illustrates graphically the convergence criteria of a gap between the main wing element and the deployed Krueger. FIG. 3b) illustrates the graphical plot showing three cases where the gap is measured along a distance S from the leading edge of the main wing to the Krueger lower surface up to its trailing edge.

For case (1) a Krueger without the flow deflector (as shown in FIG. 3a)) and with kinematic constraints which impose a divergent slot, where B (the minimum distance from the Krueger lower surface to the wing leading edge) is greater than C (the distance from the Krueger trailing edge to the wing leading edge).

For case (2) a Krueger with a trailing edge flow deflector in accordance with the invention forms a marginally convergent slot, where the trailing edge flow deflector reduces the distance from the Krueger lower surface to the wing leading edge such that it reaches a minimum at the Krueger trailing edge trailing edge C.

For case (3) a Krueger with a trailing edge flow deflector in accordance with the invention (as shown in FIG. 1) forms a fully convergent slot, where the distance from the Krueger trailing edge to the wing leading edge C is further reduced to provide a progressive reduction of the gap towards the Krueger trailing edge.

The plots for cases (2) and (3) indicate how the trailing edge flow deflector can be applied to improve the convergence of the slot.

As can be seen from case (3) the gap between the deployed Krueger and the main wing element would ideally decrease progressively aft from the leading edge of the main wing element all the way to the Krueger trailing edge—an "ideal slot shape". However, with kinematic constraints on the position and angle of the deployed Krueger this can be impossible to achieve. These kinematic constraints mean the deployed Krueger cannot be positioned in the optimal position to achieve the ideal slot shape without the trailing edge flow deflector.

Case (1) illustrates the sub-optimal condition in which kinematic constraints on the Krueger (without the flow deflector) create a slot gap which decreases and then increases when progressing aft from the leading edge of the main wing element to the Krueger trailing edge. This therefore forms a convergent-divergent slot.

Case (2), with the flow deflector applied, has a slot gap which decreases when progressing aft from the leading edge of the main wing element towards the Krueger trailing edge to provide a marginally convergent slot. This gap could also increase slightly at the Krueger trailing edge but the flow deflector still acts to significantly reduce the slot divergence to provide a beneficial aerodynamic effect.

It is possible to eliminate slot divergence entirely with the flow deflector if the slot divergence for a Krueger is sufficiently small, as shown in case (3).

The deployed Krueger in accordance with the invention will in most cases have its trailing edge in a higher position relative to the main wing element than would normally be the case. This is due to the under rotation of the Krueger to its deployed position owing to the kinematic constraints. However, this high trailing edge position can have a desirable effect since the Krueger may act as an insect shield for the main wing element. This may be particularly beneficial where the wing is a "laminar wing". Insect debris on the main wing element leading edge can promote turbulent flow and so insect shielding helps maintain laminar flow.

Figure 4:
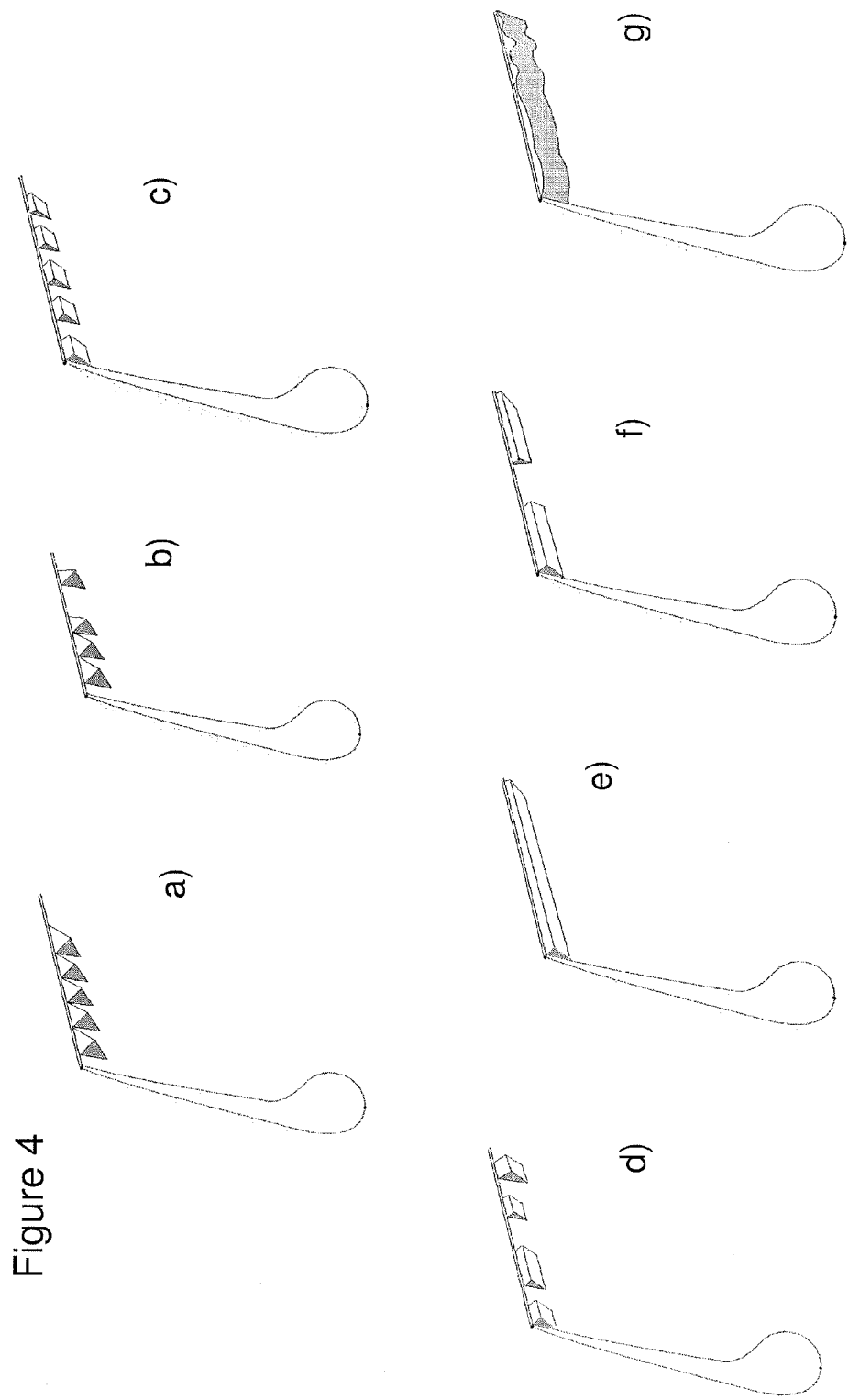
FIGS. 4a) to 4 g) illustrate examples of three dimensional installation of the flow deflector.

FIGS. 4a) to 4h) illustrate examples of three dimensional installations of the flow deflector. FIG. 4a) illustrates a flow deflector having a regular sawtooth shape across the span. FIG. 4b) illustrates a flow deflector having a varying sawtooth shape across the span. FIG. 4c) illustrates a flow deflector having a regular castellation shape across the span. FIG. 4d) illustrates a flow deflector having a varying castellation shape across the span. FIG. 4e) illustrates a flow deflector having a continuous wedge shape across the span. FIG. 4f) illustrates a flow deflector having a continuous wedge shape with one or more intermittent breaks across the span. Finally, FIG. 4g)

illustrates a flow deflector having a smoothly varying continuous wedge shape across the span.

Broadly, FIGS. 4a) to 4g) illustrate examples of three dimensional installations of the flow deflector having either: constant or varying thickness across the Krueger span; castellated or sawtooth shape variation across the Krueger span; discontinuous application across the Krueger span; or any combination of the above.

The three dimensional variation in the shape of the flow deflector can be adapted to provide a distribution of vortex generators for introducing multiple vortical flows into the slot across the Krueger span. This can improve mixing between the wake from the Krueger trailing edge and the flow through the slot which can reduce the adverse interference between the wake and the wing boundary layer. There is therefore a resultant improvement in the maximum lift of the wing.

Although the invention has been described above with reference to one or more preferred embodiments, it will be appreciated that various changes or modifications may be made without departing from the scope of the invention as defined in the appended claims.

The invention claimed is:

1. A Krueger, or leading edge flap, deployable from a lower aerodynamic surface of an aircraft main wing element so as to form a slot between the Krueger and the main wing element when deployed, the deployed Krueger having a leading edge, a trailing edge and upper and lower aerodynamic surfaces extending between the leading edge and the trailing edge, and a flow deflector fixedly attached to or integrally formed with the Krueger, said flow deflector provides an effectively divergent flap profile thickness in the downstream direction at or adjacent the Krueger trailing edge so as to direct airflow away from the lower aerodynamic surface of the deployed Krueger towards an upper aerodynamic surface of the main wing element wherein a point on the flow deflector corresponding to a maximum height of the flow deflector is in a facing relation to a leading edge of the main wing element in said deployed Krueger position.

2. A Krueger according to claim 1, wherein the flow deflector is fixed with respect to the Krueger trailing edge.

3. A Krueger according to claim 1, wherein the Krueger trailing edge is flexible.

4. A Krueger according to claim 1, wherein the flow deflector is formed as a profiled surface of the Krueger lower aerodynamic surface.

5. A Krueger according to claim 4, wherein the upper and lower Krueger aerodynamic surfaces are divergent in the downstream direction at or adjacent the Krueger trailing edge.

6. A Krueger according to claim 1, wherein the flow deflector is formed as a profiled component attached to the Krueger lower aerodynamic surface at or adjacent the Krueger trailing edge.

7. A Krueger according to claim 6, wherein the flow deflector is detachable.

8. A Krueger according to claim 1, wherein the flow deflector is formed as a tab projecting downwardly from the Krueger lower aerodynamic surface at or adjacent the Krueger trailing edge.

9. A Krueger according to claim 1, wherein the flow deflector provides a profile thickness for the Krueger at or adjacent the Krueger trailing edge that is greater than the Krueger profile thickness forward of the flow deflector.

10. A Krueger according to claim 1, wherein the flow deflector has a varying thickness or shape across the span.

11. A Krueger according to claim 1, wherein the flow deflector is discontinuous across the span.

12. A Krueger according to claim 1, wherein the flow deflector has a sawtooth and/or castellated profile adapted to generate vortical flow into a mixing region between the main wing element boundary layer and the freestream flow.

13. An aircraft wing assembly including a main wing element and a Krueger in accordance with claim 1.

14. An aircraft wing according to claim 13, wherein the deployed Krueger provides an insect shield for the main wing element.

15. An aircraft wing according to claim 13, wherein a slot, which opens up between the Krueger and the main wing element when the Krueger is deployed, is convergent forward of flow deflector.

16. An aircraft wing according to claim 15, wherein the flow deflector reduces, or eliminates, divergence of the slot at or adjacent the Krueger trailing edge.

17. An aircraft wing according to claim 13, wherein the entire Krueger including the flow deflector is stowed within a profile of the main wing element when the Krueger is retracted.

* * * * *

UNITED STATES PATENT AND TRADEMARK OFFICE
CERTIFICATE OF CORRECTION

| | | |
|---|---|---|
| PATENT NO. | : 8,657,239 B2 | Page 1 of 1 |
| APPLICATION NO. | : 13/279642 | |
| DATED | : February 25, 2014 | |
| INVENTOR(S) | : James Brown et al. | |

It is certified that error appears in the above-identified patent and that said Letters Patent is hereby corrected as shown below:

On the title page, the Foreign Application Priority Data information should be listed as follows:

Foreign Application Priority Data

October 28, 2010 (GB)............................1018176.6

Signed and Sealed this
Twelfth Day of May, 2015

Michelle K. Lee
*Director of the United States Patent and Trademark Office*